(12) United States Patent
Shikano et al.

(10) Patent No.: US 7,687,127 B2
(45) Date of Patent: Mar. 30, 2010

(54) ELECTROPHOTOGRAPHIC RECORDING SHEET AND LABEL PAPER

(75) Inventors: Tamio Shikano, Ibaraki (JP); Ichiro Ohkawachi, Ibaraki (JP); Hiroshi Koike, Ibaraki (JP); Tomotsugu Takahashi, Tokyo (JP)

(73) Assignee: Yupo Corporation, Tokyo (JP)

( * ) Notice: Subject to any disclaimer, the term of this patent is extended or adjusted under 35 U.S.C. 154(b) by 0 days.

(21) Appl. No.: 11/678,953

(22) Filed: Feb. 26, 2007

(65) Prior Publication Data

US 2007/0141290 A1 Jun. 21, 2007

Related U.S. Application Data

(60) Division of application No. 10/294,791, filed on Nov. 15, 2002, now abandoned, which is a continuation of application No. PCT/JP01/03941, filed on May 11, 2001.

(30) Foreign Application Priority Data

May 15, 2000 (JP) ............... 2000-141215
Jun. 7, 2000 (JP) ............... 2000-170663

(51) Int. Cl.
*B32B 9/00* (2006.01)

(52) U.S. Cl. ............... 428/40.1; 428/32.7; 428/137; 428/131; 428/195.1; 428/914; 430/126.1

(58) Field of Classification Search ............... 428/40.1, 428/195.1, 32.7, 914, 211, 137, 131; 430/126
See application file for complete search history.

(56) References Cited

U.S. PATENT DOCUMENTS

| | | | | |
|---|---|---|---|---|
| 5,153,042 A * | 10/1992 | Indrelie | ............... | 428/41.1 |
| 5,223,383 A * | 6/1993 | Maier et al. | ............... | 430/533 |
| 5,330,961 A * | 7/1994 | Takeyama et al. | ............... | 503/227 |
| 5,451,458 A * | 9/1995 | Malhotra | ............... | 428/32.28 |
| 5,660,925 A * | 8/1997 | Cooley et al. | ............... | 428/304.4 |
| 5,798,200 A | 8/1998 | Matsuura et al. | | |
| 5,925,446 A | 7/1999 | Matsuda et al. | | |
| 6,001,165 A | 12/1999 | Shibuya et al. | | |
| 6,028,028 A * | 2/2000 | Nitta | ............... | 428/32.18 |
| 6,136,130 A * | 10/2000 | Tataryan et al. | ............... | 156/249 |
| 6,238,775 B1 | 5/2001 | Teramoto et al. | | |
| 6,280,801 B1* | 8/2001 | Schmitt | ............... | 427/511 |
| 6,827,993 B2 | 12/2004 | Horiuchi | | |
| 6,908,658 B2 * | 6/2005 | Nitta et al. | ............... | 428/137 |
| 7,270,874 B2 * | 9/2007 | Dalgleish | ............... | 428/317.3 |
| 2001/0003731 A1 | 6/2001 | Ochiai et al. | | |

FOREIGN PATENT DOCUMENTS

| | | |
|---|---|---|
| EP | 0 436 044 A1 | 7/1991 |
| JP | 50-38665 | 12/1975 |
| JP | 56-118437 | 9/1981 |
| JP | 63-309700 A | 12/1988 |
| JP | 08-171225 A | 7/1996 |
| JP | 09-156208 | 6/1997 |
| JP | 10-020537 | 1/1998 |
| JP | 10-063030 | 3/1998 |
| JP | 11-002914 A | 1/1999 |
| JP | 11-300898 A | 11/1999 |
| JP | 2000-098647 A | 4/2000 |

* cited by examiner

*Primary Examiner*—Bruce H Hess
*Assistant Examiner*—Tamra L Dicus
(74) *Attorney, Agent, or Firm*—Oblon, Spivak, McClelland, Maier & Neustadt, L.L.P.

(57) ABSTRACT

A label paper including a thermoplastic resin sheet (A) formed by stretching along at least one axis and heat treating at 50 to 250° C., an adhesive layer (B), and a release paper (C). Under a thermomechanical analysis with heating from a room temperature to 150° C., $\alpha$ is in a range of from −2.5 to 2.5 percent, and $\alpha$-$\beta$ is in a range of from −1.5 to 1.5 percent, where $\alpha$ is a ratio of a dimension of the thermoplastic resin sheet (A) after the heating to a dimension of the thermoplastic resin sheet (A) before the heating, and $\beta$ is a ratio of a dimension of the release paper (C) after the heating to a dimension of the release paper (C) before the heating.

11 Claims, No Drawings

ELECTROPHOTOGRAPHIC RECORDING SHEET AND LABEL PAPER

CROSS REFERRENCE TO RELATED APPLICATIONS

The present application is a divisional of U.S. application Ser. No. 10/294,791, filed Nov. 15, 2002, ABN which is a continuation of PCT/JP01/03941, filed May 11, 2001, and claims benefit of priority under 35 U.S.C §119 to Japanese Application Nos. 2000-141215, filed May 15, 2000 and 2000-170663, filed Jun. 7, 2000, the entire contents of those applications are incorporated herein by reference.

BACKGROUND OF THE INVENTION

1. Field of the Invention

The present invention relates to an electrophotographic sheet and label paper suited for use in outdoor and frozen food section advertisement posters, billboards, signs, tags, labels and stickers where water repellency and durability are required, manufacturing management cards recording methods of use and warnings, and industrial product namers (labels recording methods of use and warnings).

2. Discussion of the Background

Conventionally, coated paper, water-repellent paper, and the like have been employed as sheet and label paper in outdoor advertisement posters, frozen food section tags, and the like. However, these papers have problems in the form of poor water repellency and durability. Thus, thermoplastic resin films with good water repellency and good durability, particularly polyolefin-based synthetic paper, have been employed in recent years.

Japanese Examined Patent Publication (KOKOKU) Sho Nos. 46-40794 and 49-1782, and Japanese Unexamined Patent Publication (KOKAI) Sho Nos. 56-118437, 57-12642, and 57-56224, for example, may be consulted for specifics regarding these resin films.

However, when printing on such polyolefin synthetic papers in recording modes of color electrophotographic printers such as common paper mode, label mode, OHP mode, and thick-paper mode, the toner transfer rate is low, recording density is not achieved, toner disperses to unwanted areas, and hue reproduction is poorer than that of normal paper and coated paper. Further, when there is not suitable rigidity, running properties become problematic. In particular, when jamming occurs in the toner fixing unit, the surface temperature rises (to from 140 to 200° C.) and the paper fuses to the heater, damaging the machine.

Further, when printing with a color electrophotographic printer on a label which consists of a polyolefin synthetic paper base and a release paper adhered thereto, the surface temperature of the label rises to 140 to 200° C. during toner fixation, and since polyolefin synthetic paper undergoes greater heat shrinkage than the release paper, there is a problem in the form of significant curling after printing. In severe cases, the entire label curls into a cylinder, and it becomes difficult to peel the polyolefin synthetic paper off the release paper. There is also a problem in that paper discharge is poor, precluding continuous printing, and use is difficult.

In light of these problems of prior art, an object of the present invention is to provide electrophotographic recording sheets and label paper suited for use in outdoor and frozen food section advertisement posters, billboards, signs, tags, and manufacturing management cards recording methods of use and warnings with good water repellency and durability. Specifically, the present invention has for its object to provide electrophotographic recording sheets and label paper yielding good recording density when printed with color electrophotographic printers and having good running properties.

SUMMARY OF THE INVENTION

The present inventors conducted extensive research into achieving these goals, resulting in the discovery that by adjusting the Clark stiffness and electrostatic capacitance of thermoplastic resin sheets to within specified ranges, it was possible to enhance recording density, reduce curling caused by heat during printing, and improve paper discharge properties. The present invention was devised on this basis.

That is, the present invention provides an electrophotographic recording sheet, which has an electrostatic capacity of greater than or equal to 4 pF/cm$^2$ and a Clark stiffness of from 15 to 500, and which comprises a thermoplastic resin sheet (A) that is formed by stretching along at least one axis and heat treating at 50 to 250° C.; a printing product thereof; and a label paper in the form of a laminate sequentially having an adhesive layer (B) and a release paper (C) on one surface of the thermoplastic resin sheet (A), wherein, under a thermomechanical analysis with heating from room temperature to 150° C., a dimensional change ratio ($\alpha$) of the thermoplastic sheet (A) after heating to the unheated thermoplastic sheet (A) is from $-2.5$ to $2.5$ percent and the difference ($\alpha$-$\beta$) is from $-1.5$ to $1.5$ percent, where B is a dimensional change ratio of the release (C) after heating to the unheated release (C).

In a preferred implementation mode of the present invention, thermoplastic resin sheet (A) comprises an electrostatic capacity modifier, and 1 to 190 weight parts of inorganic and/or organic finepowder per 100 weight parts of said thermoplastic resin. The void rate of thermoplastic resin sheet (A) is desirably 0 to 60 percent, the whiteness degree according to JIS L1015 is greater than or equal to 85 percent, and the opacity according to JIS P8138 is greater than or equal to 50 percent. A thermoplastic resin used in thermoplastic resin sheet (A), and a recording product thereof, is desirably an olefin resin, particularly a propylene-based resin.

In the label paper of the present invention, the electrostatic capacitance is desirably greater than or equal to 4 pF/cm$^2$. Further, when printing on A-4 size (210×297 mm) label paper with an electrophotographic printer, the average of the four corner curl heights two minutes after printing is desirably less than or equal to 100 mm.

The electrophotographic recording sheet and label paper of the present invention permit printing by electrophotographic recording methods, and such recording products are covered by the present invention.

DETAILED DESCRIPTION OF PREFERRED EMBODIMENTS

The electrophotographic recording sheet and label paper of the present invention are described in detail below. In the present Specification, the symbol "-" is used to denote a range the minimum of which is given by the preceding number and the maximum of which by the succeeding number.

The electrophotographic recording sheet of the present invention comprises at least a thermoplastic resin sheet (A) as a constituent element. Accordingly, the electrophotographic recording sheet of the present invention may consist of thermoplastic resin sheet (A) only, or it may comprise the thermoplastic resin sheet (A) and a surface treatment layer described below thereon. The label paper of the present invention has a laminate consisting of an adhesive layer (B) and a release paper (C) sequentially formed on one surface of thermoplastic resin film (A).

The thermoplastic resin sheet (A) employed in the electrophotographic recording sheet and label paper of the present invention is a sheet that comprises a thermoplastic resin and is formed by stretching along at least one axis.

The type of thermoplastic resin employed in thermoplastic resin sheet (A) is not specifically limited. Examples are high-density polyethylene, medium-density polyethylene, other ethylene resins, propylene based resins, and other polyolefin resins; polymethyl-1-butene; ethylene-cyclic olefin copolymers; nylon 6, nylon 6,6, nylon 6,10, nylon 6,12, and other polyamide resins; polyethylene terephthalate and copolymers thereof; polyethylene naphthalate; aliphatic polyesters and other thermoplastic polyester resins; polycarbonate; atactic polystyrene; syndiotactic polystyrene; and polyphenylene sulfide. Two or more of these may be mixed for use. Of these, polyolefin resins are employed with preference. Among polyolefin resins, polypropylene based resin and high-density polyethylene are employed with preference from the viewpoints of cost, water-repellence, and chemical resistance.

Examples of the propylene based resins include isotactic polymer or syndiotactic polymer, and a polypropylene having various stereoregularities obtained by homopolymerization of propylene. Alternatively, a copolymer obtained by copolymerization of propylene as a main component with α-olefin such as ethylene, butane-1, hexane-1, and heptene-1 ,4-methylpentene-1 may be used. This copolymer may have two, three, or four elements, be a random copolymer, or be a block copolymer.

Thermoplastic resins sheet (A) employed in the electrophotographic recording sheet and label paper of the present invention is characterized by an electrostatic capacity of greater than or equal to 4 pF/cm$^2$. The electrostatic capacity is desirably adjusted by employing an electrostatic capacity modifier as one of the constituent components of thermoplastic resin sheet (A).

The electrostatic capacity modifier employed in the present invention is not specifically limited other than that it be a substance capable of controlling electrostatic capacity. Representative electrostatic capacity modifiers are thermoplastic resins having a higher dielectric constant than the thermoplastic resin forming thermoplastic resin sheet (A), thermosetting resins, monomers and oligomers that are dispersible in the thermoplastic resin forming thermoplastic resin sheet (A), and inorganic fillers.

The thermoplastic resins that are employed as electrostatic capacity modifiers in thermoplastic resin sheet (A) have higher dielectric constants than the thermoplastic resin forming thermoplastic resin sheet (A). Examples are olefins, vinyl carboxylates, vinyl halides, vinyl ethers, and acrylic acids; homopolymers of the same; vinyl-derived copolymers in the form of vinyl copolymers of two or more of the same; vinylidene cyanide homo/copolymers, polyol copolymers, polyester resins, and polyamide resins.

More specific examples are olefins such as ethylene, propylene, butylene, butadiene, isoprene, chloroprene, styrene, and a-methylstyrene.

Specific examples of vinyl carboxylates are vinyl acetate, vinyl propionate, vinyl butyrate, vinyl pivalate, vinyl caproate, vinyl laurate, vinyl stearate, vinyl benzoate, vinyl butyl benzoate, and vinyl cyclohexane carboxylate.

Specific examples of vinyl halides are vinyl chloride, vinylidene chloride, vinyl fluoride, and vinylidene fluoride.

Specific examples of vinyl ethers are copolymers of methyl vinyl ether, ethyl vinyl ether, propyl vinyl ether, butyl vinyl ether, cyclopentyl vinyl ether, cyclohexyl vinyl ether, benzyl vinyl ether, and phenyl vinyl ether.

Specific examples of acrylic acids are acrylic acid, methacrylic acid, ethyl (meth)acrylate, [m]ethyl (meth)acrylate, butyl (meth)acrylate, hexyl (meth)acrylate, octyl (meth)acrylate, 2-ethylhexyl (meth)acrylate, stearyl (meth)acrylate, benzyl (meth)acrylate, cyclohexyl (meth)acrylate, isobornyl (meth)acrylate, dicyclopentanyl (meth)acrylate, (meth)acrylamide, N-meth[y]lol (meth)acrylamide, and acrylonitrile.

Specific examples of polyols are polyester polyol, polyether polyol, and acryl polyol.

More specific examples are vinylidene fluoride and polyester polyol.

Specific examples of polyester resins are polyethylene terephthalate, polybutylene terephthalate, polycyclohexanedimethylene terephthalate, and polybutylene naphthalate.

Specific example of polyamides are nylon 6, nylon 6,6, nylon 6,10, and nylon 6,12.

Examples of the thermosetting resin employed as the electrostatic capacity modifier of thermoplastic resin sheet (A) are epoxy resin, unsaturated polyester, melamine resin, phenol resin, urea resin, silicon resin, and urethane resin. Examples of monomers and oligomers dispersible in this thermosetting resin are higher alcohols, polyhydric alcohols, fatty acids, fatty acid esters, fatty acid metal salts, fatty acid amides, ammonium salts (preferably quaternary ammonium salts), sulfonates, sulfuric ester salts, phosphoric esters, phosphoric acid esterified compounds, partial esters of polyhydric alcohols, alkyl diethanol amines, alkyl diethanol amides, and polyalkylene glycol derivatives.

Preferred examples are quaternary ammonium salts, higher alcohols, polyhydric alcohols, fatty acids, fatty acid esters, phosphoric esters, and phosphoric acid esterified compounds.

Examples of inorganic fillers employed as electrostatic capacity modifiers are derivatives of zeolite, bentonite, montmorillonite, beidellite, nontronite, saponite, hexalite, sorconite, and hectite; Rochelle salt; potassium dihydrogen phosphate, rutile-type titanium oxide, barium titanate, zirconate, lithium niobate, PZT (Pb(Ti,Zr)O$_3$), GASH (C(NH$_2$)$_3$Al(SO$_4$)$_2$·6H$_2$O), DSP (Ca$_2$Sr(C$_2$H$_3$CO$_2$)$_6$), sodium nitrite, sulfur antimony iodide, and other strong dielectrics; and iron, copper, carbon, aluminum, cobalt, nickel, and other conductors. Calcium carbonate (referred to hereinafter as "treated calcium carbonate") that has been surface treated with a cationic surfactant or anionic antistatic agent in wet comminution, or the above-described fillers that have been surface treated, may also be employed.

Preferred examples are rutile-type titanium oxide, barium titanate, treated calcium carbonate, and carbon.

These electrostatic capacity modifiers may be employed singly or in combinations of two or more. Suitably adjusting the type and quantity employed of these electrostatic capacity modifiers permits achieving an electrostatic capacity of greater than or equal to 4 pF/cm$^2$ in the electrophotographic recording sheet of the present invention.

The quantity of electrostatic capacity modifier added is desirably from 0.2 to 160 weight parts, preferably from 1 to 130 weight parts, per 100 weight parts of the thermoplastic resin composition forming thermoplastic resin sheet (A). When 160 weight parts are exceeded, thermoplastic resin sheet (A) tends to rupture during drawing in the machine and crosswise directions. The thermoplastic resin composition referred to here comprises thermoplastic resin and any components other than thermoplastic resins that are added, such as inorganic and/or organic finepowders.

The electrostatic capacity modifier is added to and dispersed in the thermoplastic composition forming thermoplastic resin sheet (A). The state of dispersion of the electrostatic capacity modifier is not specifically limited.

The thermoplastic resin sheet (A) that is employed in the electrophotographic recording sheet and label paper of the present invention may comprise inorganic finepowder and/or organic finepowder. Examples of inorganic finepowders are calcium carbonate, baked clay, silica, diatomaceous earth, talc, barium sulfate, and alumina. The use of an inorganic finepowder with an average particle size of 0.01 to 15 micrometers is preferred. Of these, the use of calcium carbonate and baked clay is preferred for reasons of cost and handling.

Organic finepowders having a glass transition temperature or melting point higher than that of the principal component resin of thermoplastic resin sheet (A) may be employed. When the principal component of thermoplastic resin sheet (A) is an olefin resin, examples of organic finepowders suitable for use are polyethylene terephthalate, polybutylene terephthalate, polycarbonate, nylon 6, nylon 6,6, homopolymers of cyclic olefins, and copolymers of cyclic olefins with ethylene, which have melting points of 120 to 300° C. or glass transition temperatures of 120 to 280° C. Of these, the use of homopolymers of cyclic olefins and copolymers of cyclic olefins and ethylene is preferred for reasons of handling. The use of an organic finepowder with an average particle size of 0.01 to 15 micrometers is preferred.

The thermoplastic resin sheet (A) employed in the electrophotographic recording sheet and label paper of the present invention may have a single-layer structure, a double-layer structure comprising a base layer and a surface layer, a three-layer structure comprising a base layer with front and back surface layers, or a multilayer structure with a base layer, front and back layers, and other resin film layers present therebetween. Structures similar to these listed structures may also be employed.

When thermoplastic resin sheet (A) is a single-layer olefin resin film, preferably 1 to 190, more preferably 5 to 100, weight parts of inorganic finepowder and/or organic finepowder are incorporated per 100 weight parts of olefin resin.

When thermoplastic resin sheet (A) has a multilayered structure comprising a base layer and front and back layers, the base layer desirably comprises 1 to 190 weight parts of inorganic and/or organic finepowder per 100 weight parts of thermoplastic resin, and the front and back layers desirably comprise 0 to 300 weight parts of inorganic and/or organic finepowder per 100 weight parts of thermoplastic resin. Preferably, the base layer comprises from 3 to 100 weight parts of inorganic and/or organic finepowder per 100 weight parts of olefin resin and the front and back layers comprise from 1 to 230 weight parts of inorganic and/or organic finepowder per 100 weight parts of thermoplastic resin.

The quantity of inorganic finepowder and/or organic finepowder in a single-layer structure or in the base layer of a multilayer structure is desirably less than or equal to 190 weight parts in order to obtain a thermoplastic resin sheet (A) that is relatively flexible. The content of finepowder in the outer surface layer is desirably less than or equal to 125 weight parts to achieve a label with good outer surface strength.

Stabilizers, optical stabilizers, dispersants, lubricants, and the like may also be incorporated as needed into thermoplastic resin sheet (A) employed in the electrophotographic recording sheet and label paper of the present invention. For example, 0.001 to 1 weight parts of sterically hindered phenol-based, phosphorus-based, and amine-based stabilizers; 0.001 to 1 weight parts of sterically hindered amine-based, benzotriazole-based, and benzophenone-based optical stabilizers; and inorganic finepowder dispersants in the form of 0.01 to 4 weight parts of silane coupling agents, oleic acid, stearic acid, and other higher fatty acids, and metal soaps may be blended in 100 parts of the thermoplastic resin.

The thermoplastic resin sheet (A) employed in the electrophotographic recording sheet and label paper of the present invention is formed by stretching along at least one axis. Since stretching along at least one axis orients the molecular chains in the thermoplastic resin, significantly increasing the modulus of elasticity in surface directions, the Clark stiffness increases. Electrophotographic recording sheets and label paper the Clark stiffness of which has been adjusted to 15 to 500 have particularly good running properties during printer output. Further, stretching thermoplastic resin sheet (A) yields more uniform thickness.

Since an increase in the modulus of elasticity is not to be expected in an unstretched thermoplastic resin sheet (A), achieving a Clark stiffness exhibiting good running properties during printer output requires a paper of greater thickness than one that has been stretched; this is more expensive and unsuitable. Further, it is difficult to achieve uniform thickness, causing an increase in the range of deviation in Clark stiffness and resulting in poor running properties during printer output.

Known methods can be employed to stretch thermoplastic resin sheet (A). There is no limitation to a specific method. Examples are longitudinal stretching exploiting the differences in peripheral speed of a group of rollers; transverse stretching using a Tenter oven; and simultaneous biaxial stretching combining pressure stretching, a Tenter oven, a linear motor, and the tubular method.

The stretching temperature is suitable selected based on the type of thermoplastic resin and the stretching process. Specifically, for an amorphous resin, the stretching temperature is set at or above the glass transition temperature of the thermoplastic resin employed. For a crystalline resin, the stretching temperature is set at or above the glass transition temperature of the amorphous component and below the melting temperature of the crystalline portion. In particular, when the thermoplastic resin is a propylene homopolymer (melting point 155-167° C.), a stretching temperature of 110 to 164° C. is desirable. When high-density polyethylene (melting point 121 to 134° C.), a stretching temperature of 80 to 120° C. that is from 2 to 60° lower than the melting temperature is desirable. A stretching rate of 20 to 350 m/min is desirable.

The stretching factor is not specifically limited, and may be suitably determined based on the characteristics of the thermoplastic resin that is being targeted. For example, when stretching a thermoplastic resin in the form of a propylene homopolymer or a copolymer thereof in a single direction, the stretching factor is desirably from about 1.2 to 12-fold, preferably 2 to 10-fold, and when stretching along two axes, the surface area factor is desirably from 1.5 to 60-fold, preferably from 10 to 50-fold. When stretching some other thermoplastic resin in a single direction, the stretching factor is desirably from 1.2 to 10-fold, preferably from 2 to 5-fold, and when stretching in along two axes, the surface area factor is desirable from 1.5 to 20-fold, preferably from 4 to 12-fold.

When employing propylene homopolymer as the thermoplastic resin and manufacturing thermoplastic resin sheet (A) in a transverse stretching process employing a Tenter oven, the Clark stiffness can be effectively raised and rigidity achieved by providing a heat-setting zone in the rear half, setting the temperature as high as possible, and making the temperature of the polypropylene sheet and label paper that have been formed reach a maximum temperature that is close to their melting point. The temperature setting of the heat-setting zone can be selected based on the linear speed in the drawing step, the flow speed and flow rate of high-temperature gas blown into the heat-setting zone, the structure of the heat-setting zone, and the like. For example, a temperature setting with the range of 50 to 250° C. may be employed.

The thickness of thermoplastic resin sheet (A) after forming is normally 40 to 400 micrometers, preferably 45 to 350 micrometers, and more preferably, 50 to 300 micrometers. Particularly when inorganic and/or organic finepowders have been incorporated, at a thickness of less than 40 micrometers, the Clark stiffness is inadequate and there tend to be problems in running properties during electrophotographic printer recording.

When the thickness of thermoplastic resin sheet (A) exceeds 400 micrometers, depending on the type of electrophotographic printer, the paper may become heavy and feeding of paper from the feed roll may not be possible, precluding the passage of paper.

When thermoplastic resins sheet (A) employed in the electrophotographic recording sheet and label paper of the present invention comprises inorganic and/or organic finepowder, it is possible that fine cracking will occur on the surface of, and minute holes will form in, the sheet and label paper. In such cases, sheet and label paper that have been manufactured by a stretching process will have minute voids.

The thermoplastic resin sheet (A) employed in the present invention desirably has a void rate of from 0 to 60 percent, preferably 1 to 50 percent, as determined by the following equation:

$$\text{Void rate (\%)} = ((\rho_0 - \rho_1)/\rho_0) \times 100 \quad \text{(Equ. 1)}$$

In Equation (1), $\rho_0$ denotes the true density of the film and $\rho_1$ denotes the density of the film (JISP-8118). So long as the material prior to drawing does not contain a large quantity of air, the true density is nearly equal to the density before drawing.

The density of a thermoplastic resins sheet (A) obtained by stretching is desirably from 0.65 to 1.2 g/cm³ with a Beck smoothness of from 50 to 25,000 sec.

Thermoplastic resin sheet (A) desirably has a degree of whiteness of greater than or equal to 85 percent, preferably greater than or equal to 90 percent. Further, thermoplastic resin sheet (A) desirably has a degree of opacity of greater than or equal to 50 percent, preferably greater than or equal to 60 percent. When the degree of whiteness is less than 85 percent and opacity is less than 50 percent, contrast is low and the backing shows through, precluding use in posters and billboards.

Whiteness and opacity can be adjusted to the preferable ranges by controlling the composition of the components comprised in the resin sheet and the stretching conditions in combination.

To improve toner adhesion and prevent static, the thermoplastic resin sheet (A) employed in the present invention is desirably surface treated. Examples of surface treatment methods are surface oxidation treatment and treatment with a surface treatment agent. Surface oxidation and treatment with a surface treatment agent are desirably conducted in combination.

The corona discharge treatment, flame treatment, plasma treatment, glow discharge treatment, ozone treatment, and the like that are normally employed on films may be employed singly or in combination as the surface oxidation treatment. Of these, the corona treatment and flame treatment are preferred. For the corona treatment, the treatment level is desirably 600 to 12,000 J/m² (10 to 200 W·min/m²), preferably 1,200 to 9,000 J/m² (20 to 180 W·min/m²), and for the flame treatment, desirably 8,000 to 200,000 J/m 2, preferably 20,000 to 100,000 J/m².

A surface treatment agent having a principal component in the form of one or a mixture of two or more primers and/or antistatic polymers can be employed. Of these, the use of a surface treatment agent comprising a primer or a primer and an antistatic polymer is desirable from the perspectives of toner adhesion and preventing static.

Examples of primers suitable for use are polyethyleneimine, polyethyleneimine modified with an alkyl having 1 to 12 carbon atoms, ethyleneimine adducts such as poly(ethyleneimine-urea) and polyamine polyamide, epichlorohydrin adducts such as polyamine polyamide, and other polyethyleneimine polymers; acrylamide-acrylic ester copolymer, acrylamide-acrylic ester-methacrylic ester copolymer, polyacrylamide derivatives, oxazoline group-containing acrylic ester polymers, polyacrylic esters, and other acrylic ester polymers; polyvinylpyrrolidone, polyethylene glycol, polyvinyl alcohol, and other water-soluble resins; and polyvinyl acetate, polyurethane, ethylene-vinyl acetate copolymers, polyvinylidene chloride, chlorinated polypropylene, acrylonitrile-butadiene copolymers, and other water-dispersible resins.

Of these, the preferred compounds are polyethyleneimine-based polymers, urethane resins, and polyacrylic esters. Compounds of greater preference are polyethyleneimine-based polymers. Compounds of even greater preference are polyethyleneimines with a degree of polymerization of 20 to 3,000, ethyleneimine adducts of polyamine polyamides; and modified polyethyleneimines obtained by modifying these compounds with halogenated alkyls, halogenated alkenyls, halogenated cycloalkyls, and halogenated benzyl groups having 1 to 24 carbon atoms.

Examples of antistatic polymers are cationic, anionic, amphoteric, and other high polymer compounds. Examples of cationic antistatic polymers are polymers having quaternary ammonium salt or phosphonium salt structures, nitrogenous acrylic polymers, and acrylic or methacrylic polymers having the nitrogen of a quaternary ammonium salt structure. Examples of amphoteric antistatic polymers are acrylic or methacrylic polymers having the nitrogen of a betaine structure. Examples of cationic antistatic polymers are styrene-maleic anhydride copolymers and their alkali metal salts, alkali metal salts of ethylene-acrylic acid copolymers, and alkali metal salts of ethylene-methacrylic acid copolymers. Of these, the use of acrylic or methacrylic polymers having the nitrogen of a quaternary ammonium salt structure is preferred.

The molecular weight of the antistatic polymer can be adjusted to any level by means of polymerization conditions such as the polymerization temperature, type and quantity of polymerization initiator employed, quantity of solvent employed, chain transfer agent, and the like. Generally, the polymer obtained has a weight average molecular weight of from 1,000 to 1,000,000, with from 1,000 to 500,000 being preferred.

A surface treatment agent comprising crosslinking agents, alkali metal salts, alkaline earth metal salts, and the like as needed is employed with preference in the present invention.

The addition of a crosslinking agent to the surface treatment agent permits a further increase in coated film strength and water repellency. Examples of crosslinking agents are glycidyl ether, glycidyl ester, other epoxy compounds, epoxy resins, and isocyanate-based, oxazoline-based, formaline-based, and hydrazine-based water-dispersible resins. The quantity of crosslinking agent added is normally less than or equal to 100 weight parts per 100 weight parts of the effective components excluding the solvent of the above-described surface treatment agent.

Examples of alkali metal salts and alkaline earth metal salts suitable for use as surface treatment agents are water-soluble inorganic salts such as sodium carbonate, sodium bicarbonate, potassium carbonate, sodium sulfite, other alkali salts, sodium chloride, sodium sulfate, sodium nitrate, sodium tripolyphosphate, sodium pyrophosphate, and ammonium alum. The quantity of any of these components is normally less than or equal to 50 weight parts per 100 weight parts of effective components excluding the solvent of the above-described surface treatment agent.

Surfactants, antifoaming agents, water-soluble or water-dispersible finepowders, and other adjuvants may also be incorporated into the surface treatment agent. The quantity of any of these components is normally less than or equal to 20 weight parts per 100 weight parts of effective components excluding the solvent of the above-described surface treatment agent.

Each of the components of the above-described surface treatment agent is dissolved in water, methyl alcohol, ethyl alcohol, isopropyl alcohol, or some other hydrophilic solvent for use. However, use in the form of an aqueous solution is the common practice. The concentration of the solution is normally about 0.1 to 25 weight percent, preferably 0.1 to 11 weight percent.

Coating may be conducted by roll coater, blade coater, bar coater, air knife coater, size press coater, gravure coater, reverse coater, die coater, lip coater, spray coater, or the like. As needed, smoothing may be conducted and excess water or hydrophilic solvent may be removed in a drying step.

The coating is applied in a quantity of 0.005 to 5 $g/m^2$, preferably 0.01 to 2 $g/m^2$, based on dry solid components.

The application of the surface-treated layer onto thermoplastic resin sheet (A) may be conducted in one coating stage or multiple coating stages irrespective of whether before or after machine or transverse stretching.

In addition to the above-described forming and stretching, thermoplastic resin sheet (A) employed in the electrophotographic recording sheet and label paper of the present invention may be annealed at high temperature in a heat-setting zone as needed to reduce dimensional change in thermomechanical analysis.

In particular, thermoplastic resin sheet (A) employed in the present invention is heat treated at 50 to 250° C. following forming or following surface treatment. The heating temperature during this treatment is desirably 60 to 210° C., preferably 80 to 200° C. At less than 50° C., the effect of the heat treatment is inadequate, and a temperature exceeding 250° C. is undesirable in that the film deforms and bubbling occurs. The heating time is desirably from 2 sec to 30 days, permitting a variety of selections. However, a period of from 4 sec to 7 days is preferred, with a period of from 4 sec to 2 days being of even greater preference. At greater than 30 days, thermoplastic resin sheet (A) tends to deteriorate, and at less than 2 sec, the treatment effect is sometimes inadequate.

Examples of methods of heat treatment are heat treatment in the heat-setting zone at high temperature following stretching in the above-described Tenter oven, treatment in an oven in the form of sheets or wound rolls, and heating with a hot medium such as hot air or steam. During the heat treatment, thermoplastic resin sheet (A) may be in a state where the ends thereof are unrestricted so as to gradually shrink during heating; when the ends of thermoplastic resin sheet (A) are fixed, thermoplastic resin sheet (A) may be in a state where the space between fixtures on two corresponding ends or on two corresponding sets of ends can shrink as thermoplastic resin sheet (A) undergoes heat shrinkage; or at least two corresponding ends of thermosetting resin sheet (A) can be fixed so that they do not follow the shrinkage of thermoplastic resin sheet (A). Specific examples are the method of heating in a wound roll state in a ventilated oven; the method of heating sheets individually or with several sheets stacked together; and the method of heating by contact with at least one high temperature roll.

The thickness of thermoplastic resin sheet (A) employed in the electrophotographic recording sheet and label paper of the present invention is normally 40 to 400 micrometers, preferably 45 to 350 micrometers, and more preferably, 50 to 300 micrometers. Particularly when inorganic and/or organic finepowder is incorporated, a thickness of less than 40 micrometers yields an inadequate Clark stiffness, compromising the running properties during recording on an electrophotographic printer. A thickness exceeding 400 micrometers causes a drop in electrostatic capacity and a drop in image recording density.

On the label paper of the present invention, there is an adhesive layer (B) on one side of thermoplastic resin film (A). Various types and thicknesses (coating quantities) of adhesive layer (B) can be selected based on the type and use environment of the coated material and the strength of adhesion.

Adhesive layer (B) can be formed by coating and drying a generally employed water-based or solvent-based adhesive. Examples of adhesives suitable for use are natural rubber-based, rubber-based, and acrylic-based synthetic high polymer adhesives. The adhesive may be employed in the form of an organic solvent solution or dispersed in water in a dispersion, emulsion, or the like. To enhance the opacity of the label, pigments may be incorporated into the adhesive.

Adhesive layer (B) may be formed by coating in the form of a solution on the silicon treated surface of release paper (C). In some cases, adhesive layer (B) is directly coated onto thermoplastic resin film (A).

Adhesive layer (B) may be formed by coating with roll coater, blade coater, bar coater, air knife coater, gravure coater, reverse coater, die coater, lip coater, spray coater, or the like; as needed, smoothing may be conducted and a drying step may be employed.

The thickness of adhesive layer (B) may be variously determined based on the intended use of the label, but is normally 2 to 30 micrometers, preferably 5 to 20 micrometers.

In the label paper of the present invention, there are sequentially present on one side of thermoplastic resin film (A) an adhesive layer (B) and release paper (C). Normal, common products may be employed as release paper (C). Examples of products suitable for use are unaltered high-quality paper and craft paper; such products that have been calendered, coated with resin, or laminated with films; glassine paper; coated paper, and paper or plastic film that has been silicon processed or the like.

Since release paper (C) facilitates peeling off of adhesive layer (B) in the course of adhering the label paper, a silicone treatment is generally applied to the surface in contact with adhesive layer (B).

The electrophotographic recording sheet of the present invention has an electrostatic capacity of greater than or equal to 4 $pF/cm^2$. Further, the label paper of the present invention desirably has an electrostatic capacity of greater than or equal to 4 $pF/cm^2$. The electrostatic capacity of the electrophotographic recording sheet and label paper of the present invention is desirably 6 to 1,000 $pF/cm^2$, more preferably 8 to 800 $pF/cm^2$. When the electrostatic capacity is less than 4 $pF/cm^2$, toner transfer tends to be low and adequate image recording density tends not to be achieved no matter what recording mode of the printer is used to output the image. When the electrostatic capacity exceeds 1,000 pF/cm$^2$, during discharge of paper by the printer, the applied electric charge remains on the electrophotographic recording sheet or label paper because toner is transferred to the paper within the printer, the sheet and label paper attract each other on the paper discharge tray, and blocking tends to occur. Further, achieving an electrostatic capacity of greater than 1,000 pF/cm$^2$ requires the addition of a large quantity of electrostatic capacity modifier to the electrophotographic recording sheet or label paper, undesirably increasing manufacturing costs.

A Hewlett Packard 4192A LF Impedance Analyzer was employed to measure the electrostatic capacity of the electrophotographic recording sheet and label paper of the present invention. At a temperature of 23° C., in an atmosphere of 50 percent relative humidity, a sample larger in diameter than the electrodes was positioned between an application electrode 38 mm in diameter and a guard electrode, a voltage of 5 V was applied, measurement was conducted over a frequency range of 10 Hz to 1 MHz, and the value measured at a frequency of 300 Hz was taken as the representative value.

The electrophotographic recording sheet of the present invention is characterized by having a Clark stiffness of 15 to 500. The Clark stiffness referred to in the present Specification is the Clark stiffness in the direction in which paper passes through an electrophotographic printer.

The Clark stiffness is determined by the stiffness test according to JIS P-8143. During recording with an electrophotographic printer, the electrophotographic recording sheet is subjected to various forms of mechanical and electrostatic stress along the paper feed route; that is, forces inhibiting running properties are exerted. The present inventors discovered that the Clark stiffness indicates the resistance to such forces inhibiting running properties.

That is, the Clark stiffness of the electrophotographic recording sheet of the present invention is 15 to 500, preferably 20 to 400, more preferably 25 to 300 in the direction of passage of paper through an electrophotographic printer. When the Clark stiffness is less than 15, jamming occurs during recording by an electrophotographic printer, and when the Clark stiffness exceeds 500, the paper is unable to follow the bends along the paper transfer route in the printer and there are problems with toner image transfer.

The electrophotographic recording sheet and label paper of the present invention afford the advantages of providing adequate recording density and good running properties during recording operations. Thus, there are no impediments causing toner to scatter into unintended areas and hue reproducibility is high. Since it is possible to impart suitable stiffness to the electrophotographic recording sheet and label paper of the present invention, there is no risk of jamming or mechanical damage.

Since the electrophotographic recording sheet and label paper of the present invention yields adequate recording density in printing by electrophotographic methods and affords good running properties during recording operations, they yield electrophotographic recording products. In particular, keeping the electrostatic capacity to within a specified range, the recording products of the present invention are of a print quality equal to that of commercial PPC paper.

Due to these advantages, the electrophotographic recording sheet and label paper of the present invention are extremely useful as sheet and label paper for printing in recording systems employed electrophotographic methods.

The electrophotographic recording sheet and label paper of the present invention are particularly useful as paper for electrophotographic printers, and may also be effectively applied to relief printing, gravure printing, flexo printing, solvent offset printing, ultraviolet cured offset printing, and the like. Further, the electrophotographic recording sheet and label paper of the present invention can also be applied to methods of printing directly on sheet and label paper and roll-type rotary printing.

Further, printed matter printed on the electrophotographic recording sheet and label paper of the present invention is characterized by good water repellency and good durability. Thus, the printed matter printed on the electrophotographic recording sheet and label paper of the present invention is suited to use in environments where water repellency and durability are required. For example, the present invention can be effectively utilized in outdoor and frozen food section advertisement posters, billboards, signs, tags, stickers and manufacturing management cards recording methods of use and warnings.

The label paper of the present invention desirably has a specified dimensional change ratio in thermomechanical analysis in the range from room temperature to 150° C.

Thermomechanical analysis permits measurement using commercial thermomechanical analyzers. Representative examples of devices, principals, characteristics, and uses thereof are given in, "The 1997 General Survey of Analysis Equipment", compiled by The Japan Analysis Equipment Industry Association, Chapter IV, page 92 (Sep. 1, 1997), "Thermal Analysis" by Bernhard Wunderlich, Chapter 6, pp. 311-332, Academic Press, Inc., 1990, and other literature.

Specific examples of TMA measurement devices employed in thermomechanical analysis are the "TMA120C" from Seiko Instruments Corp., the "TMA7" from Perkin Elmer, the "TMA-50" from Shimatsu Seisakujo Corp., and the "TM-9200" from Shinku Riko Corp.

As an example of dimensional change ratio measurement before and after increased and decreased temperature measurement by TMA using the present invention, a TMA device such as the Seiko Instruments Corp. "TMA120C" is used in tension mode. A load of a range of about 1 to 20 g is selected and fixed. The dimensions of the measurement portion of the film test sample to be measured are set to a width of 4 mm and a length of 10 mm (excluding the dimension of the portions secured by clamps from above and below). Both the heating rate and cooling rate during measurement are set to 2° C./min. The measurement heating range is set to a room temperature starting point of 25 to 50° C., the temperature is increased to 150° C., the temperature is descreased to room temperature, and the dimensions are measured. The 10 mm length of the measurement portion of the test sample prior to measurement is taken as 100 percent, contraction and expansion ratios are given as percentages, and these are adopted as dimensional change ratios.

In the present invention, the dimensional change ratio ($\alpha$) of thermoplastic resin film (A) is measured by thermomechanical analysis (TMA) and is the largest dimensional change ratio prior to heating and after cooling over a range from room temperature to 150° C. among measurements obtained in the machine direction (MD) and transverse direction (TD). In the present dimension, this is from −2.5 percent (elongation) to 2.5 percent (contraction), preferably from −1.5 percent (elongation) to 1.5 percent (contraction), and more preferably from −1 percent (elongation) to 1 percent (contraction). Outside the range of from −2.5 percent to 2.5 percent, there is substantial curling as the paper passes through the printer, problems tend to occur in the passage of paper, and it is difficult to peel the thermoplastic resin film off the release paper.

Dimensional change ratio ($\beta$) of release paper (C) is measured under the same conditions as the dimensional change ratio measured by thermomechanical analysis of thermoplastic resin film (A). The dimensional change ratio in the machine direction, that is, in the pick-up direction (MD) of roll winding is taken as the dimensional change ratio of the release paper.

From the perspective of reducing the curling accompanying passage of paper through the printer, in the label paper of the present invention, the difference ($\alpha$-$\beta$) between the dimensional change ratio ($\alpha$) of thermoplastic film (A) and the dimensional change ratio ($\beta$) of release paper (C) is from −1.5 percent to 1.5 percent, preferably from −1.2 percent to 1.2 percent, and more preferably from −1.0 percent to 1.0 percent.

When the label paper of the present invention is cut to A-4 size (210×297 mm) and printed with a color electrophotographic printer, the average four-corner curl height two minutes after printing is desirably less than or equal to 100 mm.

More specifically, the label paper is cut to A-4 size (210× 297 mm in the direction of flow), left standing for one day under conditions of a constant temperature of 23° C. and a constant relative humidity of 50 percent, and printing is conducted over a paper passage route in which thermoplastic resin film (A) is positioned on top as the print surface using a commercial color electrophotographic printer (product name Phaser 740J, made by Sony Tektronix (Ltd.)). A print test model image is selected with mixed polychromatic and monochromatic patterns. After passing through the printer, the label paper is placed on a smooth platform at a temperature of 23° C. and a relative humidity of 50 percent and positioned so that the four-corner curl two minutes after passage through the printer points upward. Positive is defined as the curl being held up by the thermoplastic resin film side, negative as the curl being held up by the release paper side, and the average value of the height of the four corners is measured. This average value is desirably less than or equal to 100 mm.

The label paper of the present invention may be employed as label paper in electrophotographic printers, as well as in relief printing, photogravure printing, flexo printing, solvent offset printing, ultraviolet cured offset printing, and sheet and roll-type rotary printing.

EXAMPLES

The present invention is described in greater detail below through the description of examples. The materials, use quantities, proportions, operations and the like indicated in the examples below may be suitably modified without departing from the essence of the present invention. Accordingly, the scope of the present invention is not limited to the specific examples given below.

Examples 1-8, Comparative Examples 1-3

(Manufacturing of the Electrophotographic Recording Sheet)

To 100 weight parts of propylene homopolymer with a melt flow rate (MFR) of 4 g/10 min were blended the weight parts stated in Table 1 of calcium carbonate finepowder with an average particle size of 1.3 micrometers and 10 weight parts of high-density polyethylene with a MFR of 10 g/10 min, and to a total of 100 weight parts of propylene homopolymer and calcium carbonate were added 0.05 weight part of 3-methyl-2,6-di-t-butylphenol, 0.08 weight part of phenol based stabilizer (product name Irganox 1010, made by Ciba-Geigy Corp.), 0.05 weight part of phosphorus-based stabilizer (product name Weston 618, made by G. E. Plastics Corp.), and the weight parts indicated in Table 1 of the electrostatic modifiers indicated in Table 1 to prepare composition (b). Composition (b) was kneaded in an extruder set to 250° C., then extruded through a T-die connected to an extruder set to 230° C. and cooled in a cooling unit, yielding unstretched sheet. This sheet was heated to 155° C. and stretched 4.6-fold in the machine direction in a longitudinal stretching unit comprised of roll groups of differing peripheral speeds.

Separately, to 100 weight parts of propylene homopolymer with an MFR of 11 g/10 min were blended the weight parts stated in Table 1 of calcium carbonate with an average particle size of 1.3 micrometers, 3.5 weight parts of high-density polyethylene with an MFR of 10 g/10 min, and to a total of 100 weight parts of propylene homopolymer and calcium carbonate were blended 0.05 weight part of 3-methyl-2,6-di-t-butylphenol, 0.08 weight part of phenol based stabilizer (product name Irganox 1010, made by Ciba-Geigy Corp.), 0.05 weight part of phosphorus-based stabilizer (product name Weston 618, made by G. E. Plastics Corp.), and the weight parts indicated in Table 1 of the electrostatic modifiers indicated in Table 1 to prepare composition (a). Composition (a) was melted and kneaded in an extruder set to 240° C. and co-extruded on both sides of the stretched sheet of composition (b) obtained above to obtain a three-layer laminate (a/b/a).

The three-layer laminate obtained was heated to 150° C. in a Tenter oven and stretched 9.5-fold in the transverse direction. It was then passed through a heat-setting zone (set to 165° C.) following the Tenter oven, yielding the three-layer laminate sheet having the thickness shown in Table 1.

Both sides of this sheet were corona discharge treated at an applied energy density of 90 W·min/m$^2$.

Next, both sides of this sheet were coated using a roll coater with an aqueous solution comprising a mixture of equal quantities of butyl modified polyethyleneimine, ethyleneimine adduct of polyamine polyamide, and acrylic acid alkyl ester-based polymer having a quaternary ammonium salt structure to a quantity of about 0.1 g/m$^2$ per side once dried, and the coatings were dried to form surface treatment layers.

This sheet was then cut to B-4 size and heat treated for 15 min in a ventilated oven adjusted to 110° C. to manufacture electrophotographic recording sheet. This heat treatment was not conducted for the sample of Comparative Example 2.

(Measurement of Void Rate)

The density of each of the electrophotographic recording sheets that had been manufactured was measured in accordance with JIS P8118. The void rate was calculated as set forth above based on Equation (1).

(Measurement of Degree of Whiteness)

The degree of whiteness of each of the electrophotographic recording sheets that had been manufactured was obtained in accordance with JIS L1015.

(Measurement of Opacity)

The opacity of each of the electrophotographic recording sheets manufactured was obtained in accordance with JIS P8138.

(Measurement of Clark Stiffness)

Each of the electrophotographic recording sheets that had been manufactured was conditioned for 24 h at a constant temperature of 23° C. and a constant relative humidity of 50 percent. Based on JIS P8143, the Clark stiffness was measured in the machine direction (MD) and crosswise direction (CD).

(Measurement of Electrostatic Capacity)

Using a Hewlett Packard "4192A LF Impedance Analyzer", each of the electrophotographic recording sheets that had been manufactured that were larger in diameter than electrodes measuring 38 mm in diameter were placed between the electrodes, a voltage of 5 V was applied, and the electrostatic capacity at a frequency of 300 Hz was measured.

(Evaluation of Print Density)

Each of the electrophotographic recording sheets that had been manufactured was cut to A-4 size (210 mm MD ×297 mm CD) and was conditioned for 24 h at a constant temperature of 23° C. and a constant relative humidity of 50 percent. The electrophotographic recording sheets were then printed with a commercial color electrophotographic printer (made by Fuji Xerox (K.K.), product name Docu Print C411) at a constant room temperature of 23° C. and a relative humidity of 50 percent. The paper passage direction of the electrophotographic recording sheets was the 210 mm MD direction. Recording was conducted by feeding the paper with the recording surface facing upward. During discharge, as well, the paper was passed with the recorded surface upward.

A test model image of mixed overlapping and single colors was printed and the print density was evaluated visually according to the scale below:

⊚ Density higher than that printed commercial PPC pulp paper

○ Density equivalent to that printed on commercial PPC pulp paper

Δ Somewhat low recording density

X Extremely low recording density and some variation in density in polychromatic portions (Evaluation of Running Properties)

Printing was conducted in the same manner as above and running properties were evaluated according to the scale below:

○ Equivalent to recording on commercial PPC pulp paper

Δ Poor paper feeding (creases present, folded corners)

X Paper feeding failure (Results)

The results are presented in Table 1 below.

TABLE 1

| Electrophotographic recording sheet | Qty. of calcium carbonate added (weight parts) | | Type and quantity of electrostatic capacity modifier added (weight parts) | | Heat treatment | Thickness (micrometers) Total thickness (A/B/A) |
|---|---|---|---|---|---|---|
| | Composition (a) | Composition (b) | Composition (a) | Composition (b) | | |
| Example 1 | 75 | 18 | Quaternary ammonium salt (2.7) | Quaternary ammonium salt (1.0) | Yes | 80 (17/46/17) |
| Example 2 | 75 | 18 | Quaternary ammonium salt (2.7) | Quaternary ammonium salt (1.0) | Yes | 120 (24/72/24) |
| Example 3 | 75 | 18 | Quaternary ammonium salt (2.7) | Quaternary ammonium salt (1.0) | Yes | 250 (50/1 50/50) |
| Example 4 | 75 | 18 | Not added | Not added | Yes | 120 (26/68/26) |
| Example 5 | 75 | 18 | Not added | Not added | Yes | 250 (60/130/60) |
| Example 6 | 3 | 3 | Titanium oxide (150) | Titanium oxide (150) | Yes | 220 (60/100/60) |
| Example 7 | 75 | 18 | Polyester polyol (45) | Polyester polyol (45) | Yes | 80 (17/46/17) |
| Example 8 | 3 | 3 | Treated calcium carbonate (150) | Treated calcium carbonate (150) | Yes | 100 (25/50/25) |
| Comp. Example 1 | 75 | 18 | Not added | Not added | Yes | 35 (9/17/9) |
| Comp. Example 2 | 75 | 18 | Quaternary ammonium salt (2.7) | Quaternary ammonium salt (1.0) | No | 80 (17/46/17) |
| Comp. Example 3 | 75 | 43 | Not added | Not added | Yes | 200 (37/26/37) |

| Electrophotographic recording sheet | Void ratio | Whiteness | Opacity | Clark stiffness | | | Electrostatic capacity (pF/cm²) | Items evaluated | |
|---|---|---|---|---|---|---|---|---|---|
| | | | | Avg. value | MD | TD | | Printing density | Running properties |
| Example 1 | 26 | 93 | 86 | 32 | 20 | 43 | 40 | ⊚ | ○ |
| Example 2 | 13 | 93 | 83 | 67 | 50 | 83 | 35 | ⊚ | ○ |
| Example 3 | 17 | 96 | 94 | 312 | 253 | 371 | 18 | ○ | ⊚ |
| Example 4 | 12 | 93 | 83 | 69 | 51 | 86 | 22 | ⊚ | ○ |
| Example 5 | 17 | 96 | 94 | 330 | 270 | 390 | 10 | ○ | ⊚ |
| Example 6 | 1 | 99 | 99 | 260 | 220 | 300 | 17 | ⊚ | ⊚ |
| Example 7 | 26 | 93 | 86 | 32 | 20 | 43 | 34 | ⊚ | ○ |
| Example 8 | 20 | 96 | 95 | 46 | 31 | 60 | 160 | ⊚ | ○ |

TABLE 1-continued

| | | | | | | | | | |
|---|---|---|---|---|---|---|---|---|---|
| Comp. Example 1 | 11 | 83 | 50 | 13 | 9 | 17 | 35 | Not measurable | X |
| Comp. Example 2 | 25 | 93 | 86 | 32 | 20 | 43 | 39 | ◯ | X |
| Comp. Example 3 | 45 | 97 | 98 | 114 | 71 | 157 | 3 | X | ◯ |

(Notes)
Quaternary ammonium salt: Product name Cyastat SP, made by Am. Synamid Corp.
Titanium oxide: Product name RC-60 (rutile), made by Ishihara Sangyo
Polyester polyol: Product name PX3043Q, made by Daiichi Kogyo Seiyaku (K.K.)
Treated calcium carbonate: Made by Fimatech (Ltd.), calcium carbonate with an average particle size of 0.8 micrometer treated with diallyl amine copolymer (a cationic surfactant) during wet comminution and surface treated with an anionic antistatic agent.

Examples 9-10, Comparative Examples 4-5

(Manufacturing of Label Paper)

Polyethylene film was laminated on both sides of high-quality paper and one side thereof was treated with silicon, yielding release paper (C) 173 micrometers in thickness and having a density of 0.9 g/cm$^3$. The silicon treated surface of release paper (C) was coated with solvent-based acrylic adhesive to a dry thickness of 6 g/m$^2$ with a comma coater and the coating was dried to obtain an adhesive layer (B) 5 micrometers thick. The adhesive layer (B) on release paper (C) was adhered to thermoplastic resin sheet (A) to obtain label paper. Electrophotographic recording sheets manufactured in the examples and comparative examples listed in Table 2 were employed as thermoplastic resin sheet (A).

(Measurement of Electrostatic Capacity)

Electrostatic capacity was measured by the same method as in Examples 1-8 and Comparative Examples 1-3.

(Measurement of Dimensional Change Ratio by Thermomechanical Analysis)

The dimensional change ratio was measured in tension mode with a TMA device "TMA 120C" made by Seiko Instruments Corp. The dimension of the measurement portion of the sample of thermoplastic resin film (A) was 4 mm in width and 10 mm in length (the dimension of the portion fixed by the upper and lower clamps was 5 mm), and a tension of 5 g was applied. The rate of both increase and decrease in temperature was 2° C./min. The temperature range consisted of a starting point of 40° C., a temperature increase to 150° C., and a temperature decrease to room temperature, at which time the dimensions of the samples were measured. The 10 mm length of the measured portion of the samples prior to heating was made 100 percent and the ratios of shrinkage after heating and cooling were given as percentages. The dimensional change ratio ($\alpha$) in the MD direction and the dimensional change ratio ($\beta$) in the MD direction when a tension of 5 g was applied to release paper (C) were calculated.

(Print Density Evaluation)

Print density was evaluated by the same method as in Examples 1-8 and Comparative Examples 1-3.

(Measurement of Curl Height)

A mixed polychromatic and monochromatic image was selected as the print image for print density evaluation. After passing through the printer, the label paper was placed on a smooth platform at a temperature of 23° C. and a relative humidity of 50 percent and positioned so that the four-corner curl two minutes after passage through the printer pointed upward. Positive was defined as the curl being held up by the thermoplastic resin film side, negative as the curl being held up by the release paper side, and the average value of the height of the four corners was measured.

(Results)

The results are given in Table 2 below.

TABLE 2

| Label Paper | Thermoplastic resin sheet (A) | Electrostatic capacity (pF/cm$^2$) | Dimensional change ratio (%) | | | Printing Suitability | Curl height (mm) |
|---|---|---|---|---|---|---|---|
| | | | $\alpha$ | $\beta$ | $\alpha - \beta$ | Print density | |
| Example 9 | Example 1 | 16 | 0.6 | −0.15 | 0.75 | ◯ | 35 |
| Example 10 | Example 7 | 15 | 0.7 | −0.15 | 0.85 | ◯ | 40 |
| Comp. Ex. 4 | Comp. Ex. 2 | 16 | 3.1 | −0.15 | 3.25 | ◯ | cylinder |
| Comp. Ex. 5 | Comp. Ex. 3 | 3 | 0.6 | −0.15 | 0.75 | X | 38 |

Potential for Industrial Use

The electrophotographic recording sheet and label paper of the present invention achieve a high recording density even when printed in the recording mode that is normally set in electrophotographic printers, yielding recording product that is in no way inferior to electrophotographic recording sheets or label paper obtained using common paper or PET film. Running properties are also good during recording operation. Thus, the electrophotographic recording sheet and label paper of the present invention are suited to use in printing by various electrophotographic printers. Further, the electrophotographic recording sheet, label paper, and recorded products of the present invention have good water repellency and durability, and can thus be effectively employed as outdoor and frozen food-related advertisement posters, billboards, signs, tags, stickers, and manufacturing management cards on which are recorded methods of use and warnings.

What is claimed is:

1. A label paper comprising:
a polyolefin thermoplastic resin sheet (A) formed by stretching along at least one axis and heat treating at 50 to 250° C.;
an adhesive layer (B); and
a release paper (C),
wherein the polyolefin thermoplastic resin sheet (A) has a Clark stiffness of from 15 to 500,
wherein under a thermomechanical analysis with heating from a room temperature to 150° C., α is in a range of from −2.5 to 2.5 percent, and α-β is in a range of from −1.5 to 1.5 percent, where α is a ratio of a dimension of the polyolefin thermoplastic resin sheet (A) after the heating to a dimension of the polyolefin thermoplastic resin sheet (A) before the heating, and β is a ratio of a dimension of the release paper (C) after the heating to a dimension of the release paper (C) before the heating, and
wherein the polyolefin thermoplastic resin sheet (A) comprises an electrostatic capacity modifier including at least one of vinylidene fluorides, polyester polyols, quaternary ammonium salts, rutile-type titanium oxides, barium titanate, treated calcium carbonates and carbon.

2. The label paper according to claim 1, wherein the label paper has an electrostatic capacitance which is greater than or equal to 4 pF/cm².

3. The label paper according to claim 1, wherein the label paper has A-4 size (210×297 mm), and has four corners whose an average curl height two minutes after printing is less than or equal to 100 mm when the label paper is printed with an electrophotographic printer.

4. The label paper according to claim 1, wherein the room temperature is between 25 and 50° C.

5. The label paper according to claim 1, wherein the thermoplastic resin sheet (A), the adhesive layer (B), and the release paper (C) are sequentially disposed.

6. A recorded product produced by the process comprising:
printing a label paper comprising a polyolefin thermoplastic resin sheet (A) formed by stretching along at least one axis and heat treating at 50 to 250° C., an adhesive layer (B), and a release paper (C) by an electrophotographic method, wherein under a thermomechanical analysis with heating from a room temperature to 150° C., α is in a range of from −2.5 to 2.5 percent, and α-β is in a range of from −1.5 to 1.5 percent, where α is a ratio of a dimension of the polyolefin thermoplastic resin sheet (A) after the heating to a dimension of the polyolefin thermoplastic resin sheet (A) before the heating, and β is a ratio of a dimension of the release paper (C) after the heating to a dimension of the release paper (C) before the heating, and
wherein the polyolefin thermoplastic resin sheet (A) has a Clark stiffness of from 15 to 500, and
wherein the polyolefin thermoplastic resin sheet (A) comprises an electrostatic capacity modifier including at least one of vinylidene fluorides, polyester polyols, quaternary ammonium salts, rutile-type titanium oxides, barium titanate, treated calcium carbonates and carbon.

7. The label paper according to claim 1; wherein the electrostatic capacity modifier is a quaternary ammonium salt.

8. The label paper according to claim 1, wherein the electrostatic capacity modifier is a polyester polyol.

9. The label paper according to claim 1, wherein the electrostatic capacity modifier is a rutile-type titanium oxide.

10. The label paper according to claim 1, wherein the electrostatic capacity modifier is a calcium carbonate that has been surface treated with a cationic surfactant or anionic antistatic agent in wet comminution.

11. A label paper comprising:
a polyolefin thermoplastic resin sheet (A) formed by stretching along at least one axis and heat treating at 50 to 250° C.;
an adhesive layer (B); and
a release paper (C),
wherein the polyolefin thermoplastic resin sheet (A) has a Clark stiffness of from 15 to 500,
wherein under a thermomechanical analysis with heating from a room temperature to 150° C., α is in a range of from −2.5 to 2.5 percent, and α-β is in a range of from −1.5 to 1.5 percent, where α is a ratio of a dimension of the polyolefin thermoplastic resin sheet (A) after the heating to a dimension of the polyolefin thermoplastic resin sheet (A) before the heating, and β is a ratio of a dimension of the release paper (C) after the heating to a dimension of the release paper (C) before the heating, and
wherein the polyolefin thermoplastic resin sheet (A) comprises an electrostatic capacity modifier which increases an electrostatic capacity of the thermoplastic resin sheet (A).

* * * * *